United States Patent Office 3,332,736
Patented July 25, 1967

3,332,736
ROASTING OF VANADIUM BEARING MATE-
RIALS AND RECOVERY OF VANADIUM
VALUES THEREFROM
Merle N. Shaw and John A. Maxwell, Soda Springs,
Idaho, assignors to Kerr-McGee Corporation, a corpo-
ration of Delaware
No Drawing. Filed Apr. 27, 1965, Ser. No. 451,317
16 Claims. (Cl. 23—15)

This invention broadly relates to the roasting of vana-
dium bearing materials and to the recovery of vanadium
values from the roasted product. In one of its more specific
aspects, the invention further relates to an improved proc-
ess for roasting ferrophosphorus and recovering a high
purity vanadium product therefrom.

The invention will be described and illustrated herein-
after with specific reference to a process for recovering
vanadium values from vanadium bearing ferrophosphorus.
However, it is understood that the invention may be use-
ful in the recovery of vanadium from other types of vana-
dium bearing materials which present the problems solved
by the present invention.

Ferrophosphorus is obtained as a byproduct in the ex-
traction of phosphorus by smelting in an electric furnace
under reducing conditions. The ferrophosphorus of com-
merce usually contains about 23–30% phosphorus, 52–
62% iron, 3–9% vanadium, 2–7% chromium, and less
than 2% of other extraneous metals such as titanium,
nickel, manganese and silicon. An average analysis for
one ferrophosphorus of commerce is 27.5% phosphorus,
7.07% vanadium, 4.67% chromium, 1.23% titanium,
1.36% nickel, 0.2% manganese, 0.4% silicon and the re-
mainder iron. Ferrophosphorus has utility as a source of
high phosphorus iron, but the vanadium and chromium
values which are usually present are wasted when it is
used in this manner. It has long been desired to provide
an economical and efficient process for recovering vana-
dium values from ferrophosphorus, as this material is
available in large quantities and would be a rich source
of vanadium.

Ferrophosphorus is a reduced product and it is neces-
sary to subject it to an oxidizing roast in order to oxidize
the vanadium values to a water soluble state. As is well
known, large quantities of contaminating substances are
also rendered soluble by conventional roasting procedures
in instances where the roast is sufficiently vigorous to re-
sult in the oxidation and solubilization of vanadium
values. The contaminates appear in the resulting leach
solution and in turn in the vanadium product precipitated
therefrom. Phosphorus is an extremely deleterious con-
taminate and a vanadium oxide concentrate is rendered
useless as a commercial product in instances where the
phosphorus content exceeds more than very small
amounts, such as 0.115% $P_2O_5$ (0.05% P). It is there-
fore obvious that the control of phosphorus solubiliza-
tion during the roast is extremely important.

In accordance with one prior art process, ferrophos-
phorus was roasted under oxidizing conditions with an
alkaline alkali metal salt such as sodium carbonate or
sodium hydroxide. However, under these conditions, the
solubilization of the vanadium values also resulted in the
solubilization of prohibitive amounts of phosphorus. In
instances where a neutral alkali metal salt such as sodium
chloride was substituted for the alkaline alkali metal salt
in an effort to control the solubilization of phosphorus,
the vanadium was not sufficiently solubilized to enable
the vanadium values to be recovered in an economic and
efficient manner.

Ferrophosphorus previously has been roasted in the
presence of neutral alkali metal salts such as sodium chlo-
ride in a multiple hearth furnace of prior art design which
includes a gas burner or burners to heat the charge to re-
action temperature on the first hearth. Once the oxida-
tion reaction has been initiated, there is no need to add
additional heat as it is highly exothermic. The oxidation
reaction may take place on the second, third and fourth
hearths, for example, and the oxidation should be sub-
stantially complete by the time the roaster charge passes
from the oxidizing zone of the roaster. For the final re-
action between the oxidized vanadium and sodium chlo-
ride, additional heat is added by means of gas burners.
Thus, when the oxidation reaction is completed on the
fourth hearth, gas burners may be used on the fifth and
sixth hearths to provide the necessary heat.

While the roaster operation described above sometimes
results in satisfactory solubilization of the vanadium,
operating problems are encountered when attempts are
made to roast a mixture of ferrophosphorus and sodium
chloride. Perhaps the most serious problem is fusing of
the roaster feed, which results in slag formation and
forces a shutdown of the roaster. Additionally, there is
a problem in controlling the temperature within the roaster
on the hearths where the exothermic oxidation reaction is
taking place. The temperature control is usually attempted
by admitting air through openings in the roaster and the
excess air also provides the oxidizing atmosphere which
is necessary for oxidizing the vanadium values. This type
of temperature control has not been entirely satisfactory
and there has been a long and great need for an efficient
method of controlling the temperature within the oxida-
tion section of the roaster and at the same time elevating
the fusion temperature of the charge material, thereby
preventing fusion.

In carrying out the process of the present invention,
a diluent is added to the finely divided ferrophosphorus
and sodium chloride roaster charge mixture which raises
the fusion temperature markedly and also results in the
insolubilization of the phosphorus and other impurities.
Thus, by roasting the charge in the presence of the dilu-
ent of the present, it is possible to overcome the dis-
advantages of the prior art roasting processes. It is also
possible to produce a vanadium-bearing leach liquor
from the roasted product from which a vanadium oxide
product of commerce may be obtained in high purity, and
often without the necessity for involved purification pro-
cedures which are costly and time-consuming.

It is an object of the present invention to provide an
improved process for oxidatively roasting vanadium bear-
ing materials, and for recovering the oxidized vanadium
values from the roasted material.

It is a further object to provide an improved process for
oxidatively roasting vanadium bearing ferrophosphorus
and for recovering the oxidized vanadium values from
the roasted ferrophosphorus.

It is still a further object to provide an improved process
for raising the fusion temperature of the roaster charge
and for controlling the roasting temperature.

It is still a further object to provide an improved proc-
ess for reducing the amount of phosphorus that is solubil-
ized during the roasting of vanadium bearing ferrophos-
phorus.

Still other objects and advantages of the invention will
be apparent to those skilled in the art upon reference to the
following detailed description and the examples.

It has been discovered that when a finely divided vana-
dium bearing material is roasted under oxidizing condi-
tions in intimate admixture with a finely divided alkali
metal compound, and a finely divided alkaline earth metal
carbonate in an amount sufficient to act as a diluent, then
the problems of the prior art discussed hereinbefore are
overcome. For instance, the fusion temperature of the
roaster feed is elevated sufficiently so that fusion of the finely divided charge within the roaster is no longer a problem, and the alkaline earth metal carbonate, under the conditions of the roast, acts as a heat sink and aids greatly in controlling the temperature within the furnace during the oxidation stage. In addition, it has been further discovered that the addition to the roaster feed of the alkaline earth metal carbonate in the amount defined herein does not interfere with the solubilization of the vanadium values, and it also has the further unexpected benefit of controlling the solubilization of phosphorus values. The phosphorus is largely insolubilized and it is possible to leach the roasted product and produce a leach liquor which contains much less phosphorus as a contaminant than heretofore possible.

The presently preferred vanadium bearing material is ferrophosphorus, which will be specifically referred to in illustrating the invention. Ferrophosphorus as received is in the form of lumps of substantial size and it should be ground to a fine particle size prior to roasting. Usually, it is preferred that the ferrophosphorus be reduced to a particle size of about minus 20 to about minus 200 mesh, and for best results to about minus 100 or 120 mesh. However, larger or smaller particle size material may be used in instances where this is desired. There are advantages to grinding the ferrophosphorus to a larger particle size than minus 120 mesh, such as to about minus 80 mesh, to reduce the grinding cost and the problems of handling a finely divided material. Prior art apparatus and processes may be used for reducing the ferrophosphorus to the desired particle size, such as a hammer mill and/or ball mill.

The alkali metal compound to be mixed with the ground ferrophosphorus may be a sodium or potassium salt and preferably is sodium chloride or potassium chloride. In most instances, it is preferred that a substantially neutral sodium or potassium salt of a strong mineral acid be used, such as the sulfates, nitrates, or chlorides. Alkaline sodium or potassium salts such as the carbonates, or the bicarbonates and bisulfates, usually are not preferred since they tend to solubilize more phosphorus values. Sodium or potassium chloride should form at least a portion of the alkali metal compound for better results. Sodium chloride is much preferred over other alkali metal salts and, for best results, usually it is used as the sole alkali metal salt.

The preferred amount of alkali metal compound to be added is about 15 to 50 parts by weight, and for best results about 35–40 parts by weight, for each 100 parts by weight of the ferrophosphorus. The use of larger amounts usually is not harmful from the standpoint of the solubilization of the vanadium values, but has no advantage and is therefore uneconomic. In addition, the alkali metal compound is often the lowest melting component in the roaster and an excess tends to lower the fusion point of the roaster feed. The alkali metal compound may be added to the ferrophosphorus at any desired stage prior to the roasting.

The alkali metal compound is preferably added as a slightly coarser material than the ferrophosphorus, and may have a particle size, for example, of about minus 10–100 mesh. However, larger or smaller particle size material may be used. For economic reasons, a minus 10 mesh alkali metal compound is preferred in most instances.

The diluent to be added to the above mentioned components of the roaster feed may be calcium carbonate, magnesium carbonate, or mixtures thereof including dolomite. Specific examples include calcite or limestone, magnesite, dolomite, etc. Limestone is usually the least expensive and most readily available and is preferred for economic reasons. The alkaline earth metal carbonate may be reduced to any suitable particle size such as minus 10–100 mesh, although larger or smaller particle size material may give satisfactory results. It is important that the alkaline earth metal carbonate be added in an amount sufficient to act as a diluent and to aid in controlling the roasting temperature, such as at least 60 parts by weight for each 100 parts by weight of ferrophosphorus. Good results are obtained when about 60 to about 150 parts by weight of the alkaline earth metal carbonate are present, and usually best results with about 125–135 parts by weight, for each 100 parts by weight of the ferrophosphorus.

The three essential components of the roaster feed may be blended together in finely divided form and the blend fed to a roaster. The roaster may be of a prior art construction and a specific type is not necessary for practicing the invention. The preferred roaster is a multiple hearth, gas fired roaster with means for rabbling the above mentioned feed mixture and causing it to pass through a series of hearths and then finally from the furnace as a roasted product containing oxidized and solubilized vanadium values. In the preferred embodiment, the first zone of the roaster is provided with heating means such as gas burners for bringing the feed mixture up to the temperature at which oxidation of the vanadium values takes place. A satisfactory temperature is about 1300–1650° F., when measured in the gaseous phase approximately 6" above the roasting beds of the feed mixture. The feed mixture is usually heated up to reaction temperature when on the first hearth, and then passed to the second hearth where the oxidation reaction begins to take place. Once oxidation has commenced, there is no need for adding additional heat as the oxidation reaction is highly exothermic. In fact, it is during the oxidation phase of the roast that care must be taken to prevent the temperature from rising to a level at which the feed mixture will fuse. Fusion of the feed mixture inside the roaster results in serious operating difficulties, and usually requires that the roaster be shut down for cleaning purposes.

The presence of the alkaline earth metal carbonate in sufficient amount to act as a diluent has a two-fold beneficial effect during the oxidation stage of the roasting process. Less material for oxidation is present per unit volume and therefore less heat of oxidation is released per unit volume, and also the alkaline earth metal carbonate acts as a heat sink due both to its heat capacity and the highly endothermic decomposition thereof. Additionally, the alkaline earth metal carbonate has the beneficial effect of raising the fusion temperature of the feed mixture to a level such that fusion does not occur. The alkaline earth metal carbonate greatly simplifies the operation of the roaster and it is possible to maintain the roasting temperatnure 1300–1650° F., and preferably between 1400 and 1500° F., without any difficulty.

The oxidized vanadium values react with the alkali metal from the alkali metal compound in the final stages of the roast to form sodium vanadate salt. Additional heat is provided in the final hearth of the roaster, or once the oxidation is no longer sufficiently vigorous to maintain the desired roasting temperature, to aid in the final reaction and conversion of the oxidized vanadium to the sodium vanadate salt. Once the reaction forming sodium vanadate is complete, the resulting roasted ferrophosphorus may be cooled following a desired prior art quenching procedure. The quenching step may be accomplished by allowing the hot roast to cool in air at ambient temperature, air or steam may be passed over the hot roast, or it may be sprayed with water or actually immersed in water.

The quenched roasted product may be processed to recover the solubilized vanadium by prior art processes. For instance, the roast may be percolation or agitation leached with water or water containing a desired solubilizing constituent or aid. The resulting leach liquor contains the solubilized vanadium values and greatly reduced amounts of phosphorous and other undesirable impurities than would otherwise be present in the absence of the roast of the alkaline earth metal carbonate.

The vanadium values may be recovered from the leach liquor by any suitable prior art procedure. While not limited thereto, one method involves precipitating the vanadium values as ammonium metavanadate by addition of ammonium chloride. The resulting ammonium metavanadate may be purified by digestion in the presence of a small amount of base such as sodium hydroxide or sodium carbonate, and then reprecipated as ammonium metavanadate by addition of a further quantity of ammonium chloride. The purified ammonium metavanadate may be dried, decomposed by heating to form vanadium pentoxide, and fused to produce black cake.

A vanadium product also may be recovered from the leach liquor by acidification with sulfuric acid to a pH range at which the vanadium values are precipitated as red cake, and then heating the liquor between about 60° C. and the boiling point. Also, the vanadium values may be recovered by acidifying the liquor to a pH value of about 0.5–1.7, followed by heating as above to precipitate the vanadium values as a hydrous vanadium oxide product. In either instance, the red cake or vanadium oxide product may be fused to product black cake.

An excessive amount of the alkaline each metal carbonate should not be added to the roaster feed as insoluble calcium vanadates may be formed and the vanadium values will not be leached out in the subsequent leaching step. Usually, the maximum amount which should be added is about 5 moles of the alkaline earth metal carbonate for each 3 moles of phosphorus present in the ferrophosphorus.

The foregoing detailed description and the following specific examples are for purposes of illustration only and are not intended as being limiting to the spirit or scope of the appended claims.

*Example I*

A commercial ferrophosphorus containing 8.8% vanadium and 24–26% phosphorus was used in preparing the roaster feed for this example. The ferrophosphorus was grounded to 98% minus 150 mesh (Tyler). The ground ferrophosphorus was mixed with sodium chloride ground to minus 35 mesh, and limestone ground to minus 16 mesh (93% $CaCO_3$, and the remainder largely inert materials), and the mixture was blended.

The roaster used was a prior art 18" I.D. gas-fired, natural draft, 4-hearth laboratory scale roaster having two rabble arms per hearth. A blend of the feed composition containing 100 parts by weight of the ferrophosphorus, 40 parts by weight of the sodium chloride, and 100 parts by weight of the limestone was fed to the roaster at the rate of 5.3 pounds per hour, and was roasted therein for 30 minutes at an average roasting temperature of 1475° F. The roasting temperature was measured in the gases above the beds of the roasting ferrophosphorus at a distance of about 6" above the hearths. An oxidizing atmosphere was maintained in the roaster by supplying air thereto in an amount in excess of the quantity required to combust the gas, thereby oxidizing the vanadium values.

Rabbling was excellent throughout the run, and no stickiness or slagging was observed in the roaster. This was surprising as a large amount of sodium chloride was present and the roasting temperature was elevated to 1475° F.

The roasted ferrophosphorus was leached with water to produce a vanadium-bearing leach liquor containing 85.4% by weight of the vanadium content of the roasted product. Thus, there was excellent solubilization of the vanadium. The phosphorus content of the leach liquor was also reduced as the vanadium-to-phosphorus ratio (V/P) was about 40:1, as compared with a (V/P) ratio of about 20:1 when the roast did not contain the added limestone. It is possible to precipitate the vanadium values from the leach liquor by adjusting the pH to 0.5–1.75, adding a small amount of sodium chlorate as an oxidizing agent for any reduced vanadium values, and heating to approximately 80–100° C. The precipitated vanadium oxide product is filtered, dried and fused to obtain a black cake meeting commercial specifications as to phosphorus and other contaminants.

*Example II*

The general procedure of Example I was followed with the exception that the feed blend was roasted at an average temperature of 1400° F. Upon leaching the roasted product with water, 74.3% of the vanadium content was water soluble.

*Example III*

A feed blend as in Example I was roasted at an average temperature of 1275° F., and the general procedure of Example I was otherwise followed. The leach liquor contained 57.9% of the vanadium content of the roasted product.

*Example IV*

The general procedure of Example I was followed with the exception that the feed blend was roasted at an average temperature of 1550° F. The leach liquor contained 73.4% of the vanadium content of the roasted product.

*Example V*

A run identical to Example I except for use in the feed blend of 150 parts of weight of limestone instead of 100 parts resulted in solubilization upon leaching the roasted product of 42.1% of the vanadium.

*Example VI*

A run identical to Example I except for use in the feed blend of 125 parts by weight of limestone instead of 100 parts resulted in solubilization upon leaching the roasted product of 61.8% of the vanadium.

*Example VII*

A run identical to Example I except for use in the feed blend of 35 parts by weight of sodium chloride instead of 40 parts resulted in solubilization upon leaching the roasted product of 76.8% of the vanadium.

*Example VIII*

A feed blend having a composition on a weight basis of 100 parts ferrophosphorus, 35 parts sodium chloride and 120 parts magnesium carbonate was roasted at 1300° F. The general procedure of Example I was otherwise followed. The vanadium content of the roasted product was 43.7% water soluble upon leaching with water.

*Example IX*

A run similar to Example VIII was made, but at a roasting temperature of 1390° F. The vanadium in the product was 66.7% water soluble upon leaching.

*Example X*

A run similar to Example IX, except for using dolomite in place of magnesium carbonate, resulted in a water solubility of 74.3% of the vanadium upon leaching with water.

*Example XI*

The general procedure of Example I was followed except as noted hereinafter.

A feed blend composed of 19,987 pounds of ferrophosphorus, 6,816 pounds of sodium chloride, and 23,786 pounds of limestone was fed to the roaster over a 24-hour period. The average temperature in the oxidation zone of the roaster was 1425° F. No problem due to slagging was encountered, and the vanadium in the roasted product was 86% water soluble upon leaching with water.

What is claimed is:

1. A process for recovering vanadium values from vanadium bearing material comprising roasting under oxidizing conditions at a temperature of about 1300–1650° F. a finely divided mixture including ferrophosphorus, at least one substance selected from the group consisting of substantially neutral sodium and potassium sulfates, nitrates and chlorides, and an alkaline earth metal carbonate selected from the group consisting of calcium carbonate, magnesium carbonate and mixtures thereof, the alkaline earth metal carbonate being present in an amount of at least 60 parts by weight for each 100 parts by weight of the ferrophosphorus, leaching the roasted product with an aqueous leaching medium to produce an aqueous solution containing vanadium values, and recovering the vanadium values from the aqueous solution.

2. The process of claim 1 wherein the alkaline earth metal carbonate is present in an amount of about 60–150 parts by weight for each 100 parts by weight of the ferrophosphorus.

3. The process of claim 2 wherein the alkali metal compound is sodium chloride.

4. A process for recovering vanadium values from vanadium bearing ferrophosphorus comprising roasting under oxidizing conditions at a temperature of about 1300–1650° F. a finely divided mixture including ferrophasphorus containing about 23–30% phosphorus, at least one substance selected from the group consisting of substantially neutral sodium and potassium sulfates, nitrates and chlorides, and at least one alkaline earth metal carbonate selected from the group consisting of calcium carbonate, magnesium carbonate and mixtures thereof, the alkaline earth metal carbonate being present in an amount of about 60–150 parts by weight for each 100 parts by weight of the ferrophosphorus, leaching the roasted product with an aqueous leaching medium to produce an aqueous solution containing vanadium values, and recovering the vanadium values from the aqueous solution.

5. The process of claim 4 wherein the alkali metal salt is sodium chloride, and the sodium chloride is present in an amount of about 15–50 parts by weight for each 100 parts by weight of the ferrophosphorus.

6. The process of claim 5 wherein the alkaline earth metal carbonate is present in an amount not exceeding 5 moles of alkaline earth metal for each 3 moles of phosphorus contained in the ferrophosphorus.

7. The process of claim 5 wherein the alkaline earth metal carbonate is limestone.

8. The process of claim 5 wherein the alkaline earth metal carbonate is dolomite.

9. The process of claim 5 wherein the ferrophosphorus is roasted at a temperature of about 1400–1500° F., the sodium chloride is present in an amount of about 35–40 parts by weight for each 100 parts by weight of ferrophosphorus, and the alkaline earth metal carbonate is present in an amount of about 125–135 parts by weight for each 100 parts by weight of ferrophosphorus.

10. A process for recovering vanadium values from ferrophosphorus comprising roasting under oxidizing conditions at a temperature of about 1400–1500° F. a mixture consisting essentially of about 100 parts by weight of ferrophosphorus having a particle size of about minus 20–200 mesh, about 15–50 parts by weight of sodium chloride having a particle size of about minus 10–100 mesh, and about 60–150 parts by weight of limestone having a particle size of about minus 10–100 mesh, the ferrophosphorus containing about 23–30% phosphorus, about 3–9% vanadium and the remainder iron and incidental metals and impurities and being roasted in the presence of an elemental oxygen containing gas over a period of time sufficient to oxidize the vanadium values to a water soluble state, leaching the roasted product with an aqueous leaching medium to produce an aqueous solution containing vanadium values, and recovering the vanadium values from the aqueous solution.

11. A process for recovering vanadium values from vanadium bearing material comprising roasting under oxidizing conditions at a temperature of about 1300–1650° F. a finely divided mixture containing ferrophosphorus, at least one substance selected from the group consisting of substantially neutral sodium and potassium sulfates, nitrates and chlorides, and an alkaline earth metal carbonate selected from the group consisting of calcium carbonate, magnesium carbonate and mixtures thereof, the alkaline earth metal carbonate being present in an amount of at least 60 parts by weight for each 100 parts by weight of the ferrophosphorus, cooling the resulting roasted product containing water soluble vanadium values, leaching the roasted product with an aqueous leaching medium to produce an aqueous solution of vanadium values, precipitating the vanadium values from the aqueous solution by addition thereto of a precipitant for the vanadium values, and separating the percipitated vanadium values from the aqueous solution.

12. The process of claim 11 wherein the alkaline earth metal carbonate is present in an amount of about 60–150 parts by weight for each 100 parts by weight of the ferrophosphorus.

13. The process of claim 11 wherein the alkali metal compound is sodium chloride.

14. A process for recovering vanadium values from vanadium bearing ferrophosphorus comprising roasting under oxidizing conditions at a temperature of about 1300–1650° F. a finely divided mixture including ferrophosphorus containing about 23–30% phosphorus, at least one substance selected from the group consisting of substantially neutral sodium and potassium sulfates, nitrates and chlorides, and at least one alkaline earth metal carbonate selected from the group consisting of calcium carbonate, magnesium carbonate, and mixtures thereof, the alkaline earth metal carbonate being present in an amount of about 60–150 parts by weight for each 100 parts by weight of the ferrophosphorus, cooling the resulting roasted product containing water soluble vanadium values, leaching the roasted product with an aqueous leaching medium to produce an aqueous solution of vanadium values, precipitating the vanadium values from the aqueous solution by addition thereto of a precipitant for the vanadium values, and separating the precipitated vanadium values from the aqueous solution.

15. The process of claim 14 wherein the alkali metal salt is sodium chloride, the sodium chloride being present in an amount of about 15–50 parts by weight for each 100 parts by weight of the ferrophosphorus.

16. The process of claim 15 wherein the ferrophosphorus has a particle size of about minus 20–200 mesh and is roasted at a temperature of about 1400–1500° F., the sodium chloride has a particle size of about minus 10–100 mesh and is present in an amount of about 35–40 parts by weight for each 100 parts by weight of ferrophosphorus, the alkaline earth metal carbonate has a particle size of about minus 10–100 mesh and is present in an amount of about 125–135 parts by weight for each 100 parts by weight of ferrophosphorus, and the aqueous leaching medium is water initially.

References Cited

UNITED STATES PATENTS

| 1,015,469 | 1/1912 | Bleecher | 23—16 |
| 1,531,541 | 3/1925 | Carpenter | 23—19.1 X |
| 1,596,483 | 8/1926 | Frick | 23—19.1 |
| 2,193,092 | 3/1940 | Frick et al. | 23—19.1 |
| 2,257,978 | 10/1941 | Robertson et al. | 23—19.1 |
| 2,822,240 | 2/1958 | Dunn et al. | 23—140 X |
| 3,206,277 | 9/1965 | Burwell et al. | 23—18 |

FOREIGN PATENTS

| 403,025 | 12/1933 | Great Britain. |

OSCAR R. VERTIZ, *Primary Examiner.*

H. T. CARTER, *Assistant Examiner.*